(12) United States Patent
Kim

(10) Patent No.: US 9,075,563 B2
(45) Date of Patent: Jul. 7, 2015

(54) AUGMENTED REALITY DISPLAY SYSTEM AND METHOD FOR VEHICLE

(75) Inventor: Jin Woo Kim, Gyeongbuk (KR)

(73) Assignee: Electronics and Telecommunications Research Institute, Daejeon (KR)

(*) Notice: Subject to any disclaimer, the term of this patent is extended or adjusted under 35 U.S.C. 154(b) by 167 days.

(21) Appl. No.: 13/325,485

(22) Filed: Dec. 14, 2011

(65) Prior Publication Data
US 2012/0154441 A1  Jun. 21, 2012

(30) Foreign Application Priority Data
Dec. 16, 2010  (KR) .................. 10-2010-0129475

(51) Int. Cl.
| | | |
|---|---|---|
| *G09G 5/00* | (2006.01) | |
| *G06F 3/147* | (2006.01) | |
| *G01C 21/36* | (2006.01) | |
| *G06F 3/01* | (2006.01) | |
| *G06K 9/00* | (2006.01) | |

(Continued)

(52) U.S. Cl.
CPC .............. *G06F 3/147* (2013.01); *G01C 21/365* (2013.01); *G06F 3/013* (2013.01); *G09G 2320/0261* (2013.01); *G09G 2340/0464* (2013.01); *G09G 2380/10* (2013.01); *G06K 9/00832* (2013.01); *G08G 1/09623* (2013.01); *G02B 27/01* (2013.01); *G06K 9/00604* (2013.01); *G06K 9/00845* (2013.01); *G02B 27/0101* (2013.01); *G02B 2027/0138* (2013.01); *G02B 2027/0187* (2013.01)

(58) Field of Classification Search
CPC ............................. G06T 19/006; G06T 19/00
USPC ..................................... 345/633, 632
See application file for complete search history.

(56) References Cited

U.S. PATENT DOCUMENTS 7,401,920 B1 * 7/2008 Kranz et al. ............... 351/210
7,809,160 B2 * 10/2010 Vertegaal et al. ........... 382/103
(Continued)

FOREIGN PATENT DOCUMENTS

| KR | 1020070019813 | 2/2007 |
|---|---|---|
| KR | 1020100026466 | 3/2010 |

OTHER PUBLICATIONS

Mohan Manubhai Trivedi and Shinko Yuanhsien Cheng, "Holistic Sensing and Active Displays for Intelligent Driver Support Systems", IEEE Comptuer Magazine: Special Issue on Human-centered Computing (May 2007).*

*Primary Examiner* — Devona Faulk
*Assistant Examiner* — Jin Ge
(74) *Attorney, Agent, or Firm* — Nelson Mullins Riley Scarborough LLP

(57) ABSTRACT

A system includes a head front display device, an eye position tracking camera to track movement of a driver's irises, a front view camera to take a picture of a front view of the driver, a head front display device controller to implement at least one of an angle change, forward movement, backward movement, upward movement, downward movement, leftward movement, and rightward movement of the head front display device, an image adjuster to adjust an object displayed on the head front display device in association with an object of an actual view seen through the front window of the vehicle based on positions of the driver's irises obtained through the eye position tracking camera and an image of the front view obtained by the front view camera, and a display unit controlled by the image adjuster and configured to display information on the head front display device.

7 Claims, 8 Drawing Sheets

(51) Int. Cl.
 *G08G 1/0962* (2006.01)
 *G02B 27/01* (2006.01)

(56) References Cited

U.S. PATENT DOCUMENTS

| | | | |
|---|---|---|---|
| 2005/0046953 A1* | 3/2005 | Repetto et al. | 359/630 |
| 2006/0262140 A1* | 11/2006 | Kujawa et al. | 345/633 |
| 2007/0019297 A1* | 1/2007 | Stewart et al. | 359/630 |
| 2008/0158096 A1* | 7/2008 | Breed | 345/7 |
| 2008/0285138 A1* | 11/2008 | Lebreton | 359/630 |
| 2010/0198506 A1 | 8/2010 | Neilhouse | |
| 2010/0253542 A1* | 10/2010 | Seder et al. | 340/932.2 |
| 2011/0227717 A1* | 9/2011 | Kumon | 340/441 |
| 2011/0260965 A1* | 10/2011 | Kim et al. | 345/156 |

\* cited by examiner

AUGMENTED REALITY DISPLAY SYSTEM AND METHOD FOR VEHICLE

CLAIM FOR PRIORITY

This application claims priority to Korean Patent Application No. 10-2010-0129475 filed on Dec. 16, 2010 in the Korean Intellectual Property Office (KIPO), the entire contents of which are hereby incorporated by reference.

BACKGROUND

1. Technical Field

Example embodiments of the present invention relate in general to an augmented reality display system, and more specifically, to an augmented reality display system and method for a vehicle, which are capable of intuitively providing a driver with information using a transparent display.

2. Related Art

Conventional augmented reality techniques employ devices such as a head mounted display to provide a user with various kinds of information. Further, techniques for operating an object augmented in augmented reality using gesture recognition have been actively studied. As a three-dimensional (3D) display device has been recently developed, users can see contents with a three-dimensional effect without wearing glasses. Similarly, techniques that allow a user to perform an operation by gesture recognition while viewing a 3D display device without using any tools have been researched.

Meanwhile, a transparent display device has not been used inside a vehicle at all, and techniques of simply displaying a navigation function in the front like a head up display (HUD) have been studied. However, these techniques have a problem in that only a navigation screen is simply displayed and an operation is performed by pressing a button down. This technique cannot intuitively provide a driver with information and may actually inconvenience the driver. In addition, even though a transparent display device is attached to the front of the vehicle, light from the display may interfere with the driver's vision.

As described above, the conventional techniques do not overcome the limitations of a gauge, an AV system, a navigation device, etc., as devices for providing the driver with information in the vehicle.

SUMMARY

Accordingly, example embodiments of the present invention are provided to substantially obviate one or more problems due to limitations and disadvantages of the related art.

Example embodiments of the present invention provide an augmented reality display system for a vehicle which is configured to provide a driver with intuitive information using a transparent display positioned between the driver and a front window of the vehicle.

Example embodiments of the present invention also provide an augmented reality display method for a vehicle capable of providing a driver with intuitive information using a transparent display positioned between the driver and a front window of the vehicle.

In some example embodiments, an augmented reality display system for a vehicle includes: a head front display device using a transparent display positioned between a driver and a front window; an eye position tracking camera configured to track movement of a driver's irises; a front view camera configured to take a picture of a front view of the driver; a head front display device controller configured to implement at least one of an angle change, forward movement, backward movement, upward movement, downward movement, leftward movement, and rightward movement of the head front display device; an image adjuster configured to adjust an object displayed on the head front display device in association with an object of an actual view seen through the front window of the vehicle based on positions of the driver's irises obtained through the eye position tracking camera and an image of the front view obtained by the front view camera; and a display unit controlled by the image adjuster and configured to display information on the head front display device.

The eye position tracking camera may be installed at a position in front of and facing the driver.

The front view camera may be installed above a driver's head or in front of the driver.

The eye position tracking camera may be configured to learn positions of the driver's irises recognized by the eye position tracking camera and a relative iris position when the driver sees four or more lattice points displayed on the head front display device, and recognize the positions of the driver's irises based on the learning result.

The image adjuster may adjust the object displayed on the head front display device by adjusting a shape, size, or position of the object displayed on the head front display device in association with the object in the actual view.

In other example embodiments, an augmented reality display method for a vehicle for operating a head front display device using a transparent display positioned between a driver and a front window includes: tracking movement of a driver's irises; taking a picture of a front view of the driver; adjusting a shape, size, or position of an object displayed on the head front display device in association with positions of the driver's irises and an actual object in the front view; and displaying an object whose image is adjusted on the head front display device.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
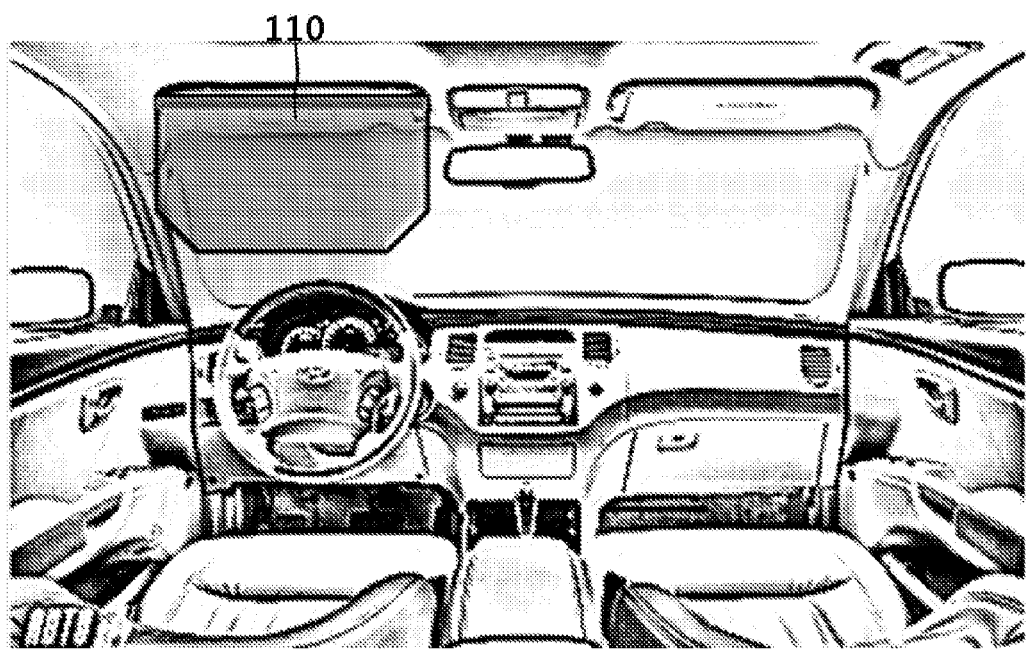
FIG. 1 is a conceptual diagram for explaining a concept of an augmented reality display system for a vehicle according to the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In an embodiment of the present invention, an augmented reality technique is implemented inside a vehicle using a transparent display. The transparent display is positioned between a driver and a front window of the vehicle, above a driver's head. The transparent display may be configured to move toward the driver so that a display environment can be constructed in front of the driver. Hereinafter, as the display device of the present invention, the transparent display attached above the driver's head for the driver is referred to as a head front display (HFD).

First, characteristics of an external appearance of the augmented reality display system according to the present invention will be described with reference to FIGS. 1 to 3.

FIG. 1 is a conceptual diagram for explaining a concept of an augmented reality display system for a vehicle according to the present invention.

Referring to FIG. 1, a transparent display device 110, that is, a head front display, is mounted between a driver and a front window in the vehicle to be positioned in front of the driver's eyes. The head front display 110 is calibrated and adjusted in real time through a camera module (not shown in FIG. 1) that tracks the driver's angle of vision.

In addition, the driver's angle of vision and a sight direction of a camera attached to the front of the vehicle are tracked in real time, and image adjustment is performed so that appropriate information can be displayed on the head front display. The reason why information has to be displayed according to the driver's eyes is as follows: it is because when the driver is viewing a near or far image through the front window of the vehicle, the driver's eyes are not focused on information displayed on the transparent display, or information displayed on the transparent display is not centered in the driver's field of vision. That is, in order to allow the driver to see both a distant object (an actual view seen through the front window of the vehicle) and a nearby object (information displayed on the display device), parallax of both eyes has to be adjusted to prevent an image from being out of focus or seen as double. A concept of such image adjustment will be described later.

Figure 2:
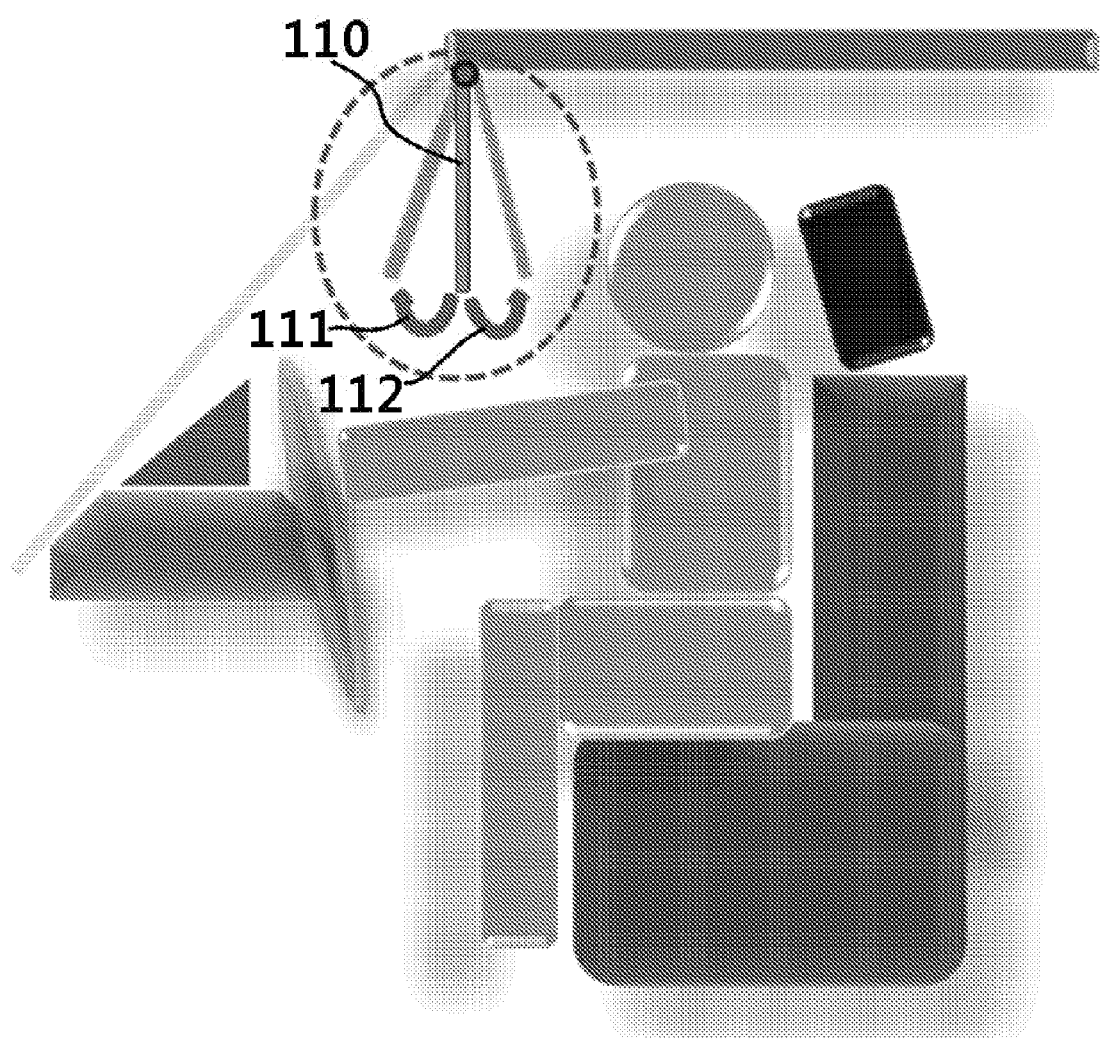
FIG. 2 is a conceptual diagram for explaining the position and operation of a display device in an augmented reality display system for a vehicle according to the present invention from a driver's point of view.

FIG. 2 is a conceptual diagram for explaining the position and operation of a head front display in an augmented reality display system for a vehicle according to the present invention from the driver's point of view.

Referring to FIG. 2, the transparent display 110 is positioned at an upper front end of the vehicle window and configured to perform a position change 111 or 112 through a servo motor or other mechanism. The reason why the position change has to be performed is because an automatic operation according to circumstances needs be performed in order to cope with a security situation, an unexpected situation, or the like, as well as driving. For example, when a collision occurs in the front portion of the vehicle, the position of the display device 110 may need to be rapidly changed in order to prevent the display device 110 from hitting the driver or from interfering with operation of an airbag. Further, when the driver gets into or out of the vehicle, the position of the display device needs be changed so as to allow the driver to operate other devices. Accordingly, the position change is necessary.

Figure 3:
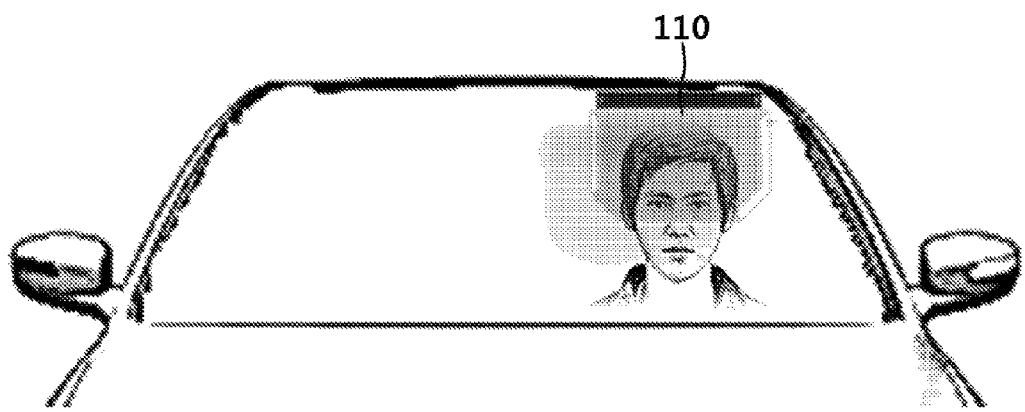
FIG. 3 is a conceptual diagram illustrating an appearance of a display device of an augmented reality display system for a vehicle according to the present invention, which is seen from the front of a vehicle.

FIG. 3 is a conceptual diagram illustrating an appearance of a display device of an augmented reality display system for a vehicle according to the present invention, viewed from the front of the vehicle.

Referring to FIG. 3, the display device of the augmented reality display system for the vehicle according to the present invention includes the transparent display. The display device is positioned not only to allow light incident through the front window to be passed to the driver but also to allow an actual view seen through the front window and information displayed on the display device to be simultaneously seen by the driver.

Figure 4:
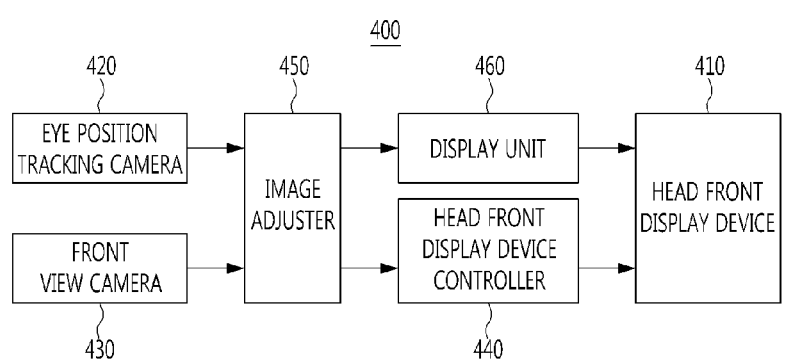
FIG. 4 is a block diagram for explaining a configuration of an augmented reality display system for a vehicle according to the present invention.

FIG. 4 is a block diagram for explaining a configuration of an augmented reality display system for a vehicle according to the present invention.

Referring to FIG. 4, the augmented reality display system for the vehicle according to the present invention may be configured to include a head front display device 410, an eye position tracking camera 420, a front view camera 430, a head front display device controller 440, an image adjuster 450, and a display unit 460.

The head front display device 410 is a display device using a transparent display positioned between a driver and a front window, and refers to the display device 110 described with reference to FIGS. 1 to 3.

The eye position tracking camera 420 is a component for tracking a driver's eye position. The eye position tracking camera 420 acquires information used for adjusting an image displayed on the display according to a driver's eye direction. The eye position tracking camera 420 is positioned in front of the driver, for example, at a distance of 30 cm from the driver. The eye position tracking camera 420 is configured to recognize the irises of the driver's eyes and track movement of the irises.

The eye position tracking camera 420 recognizes the irises of both eyes, calculates a vector component between a central point between the irises and a lattice point displayed on the transparent display in a camera calibration process, and uses a vector component between an object seen in the front and the driver's eyes as driver eye tracking information. In addition, in order to accurately detect the driver's eyes, a face detecting process needs to be performed in advance.

The front view camera 430 takes a picture of a front view seen through the front window of the vehicle. That is, the front view camera 430 takes a picture of a front view while tracking the driver's eye direction tracked by the eye position tracking camera 420. At this time, the front view camera 430 may be positioned above the driver's head or in front of the driver so as to provide an image with which the driver's eyes meet. The front view camera 430 may be configured to pan a shooting direction up, down, right, or left. However, when a wide-angle lens having a wide viewing angle is used, the front view camera 430 may be configured to recognize an image portion in the driver's eye direction recognized by the eye position tracking camera 420 from an image captured in a fixed state without mechanical driving.

The head front display device controller 440 is a component for implementing at least one of an angle change, forward movement, backward movement, upward movement, downward movement, leftward movement, and rightward movement of the head front display device 410. The head front display device controller 440 is a component for driving the head front display device 410 as described with reference to FIG. 2. The head front display device controller 440 may be configured to include an electronic control servo motor, a driving shaft, and the like, and to mechanically drive the head front display device 410.

Figure 5:
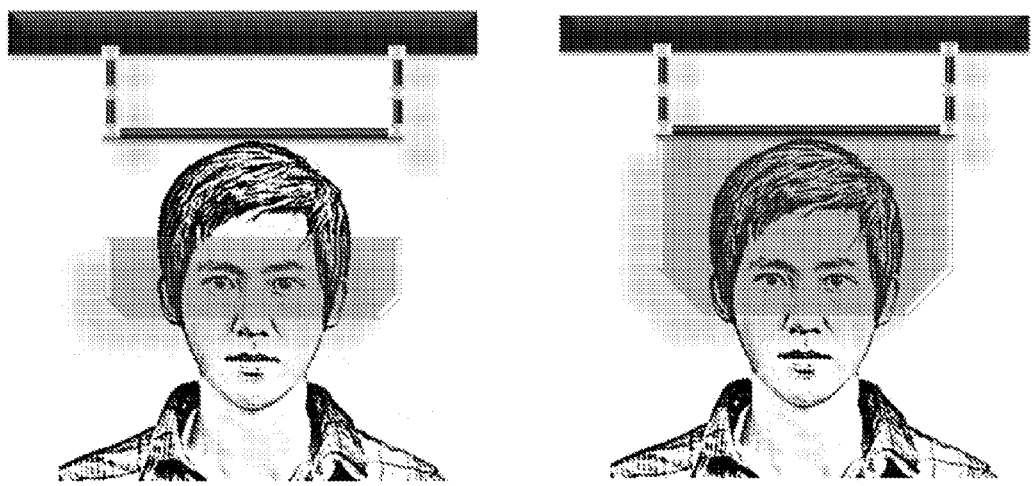
FIG. 5 is a conceptual diagram for explaining a concept of adjusting the position of a head front display device in view of a driver's field of vision.

The head front display device controller 440 may function to adjust the position of the head front display device 410 in view of the driver's field of vision. FIG. 5 is a conceptual diagram for explaining a concept of adjusting the position of the head front display device in view of the driver's field of vision.

Referring to FIG. 5, when the head front display device is used to display simple information or search information during driving, the head front display device controller 440 causes the display device to be positioned at an upper portion slightly outside of the center of the driver's field of vision (left drawing). However, in order to allow the driver to use the augmented reality, the head front display device has to come into the driver's field of vision and to augment information on an image actually seen through the front window. In this case, the head front display device controller 440 causes the head front display device to be positioned in the center of the driver's field of vision (right drawing).

At this time, the head front display device controller 440 constantly stores data on the driver's seat position and the driver's eye position and analyzes the data in the calibration process when the system starts. That is, under the assumption that the driver can be identified, the driver's previous posture information can be used as calibration information for driving and positioning the transparent display when the system starts.

As described above, the head front display device controller 440 is a component for enabling the head front display device to move its position or perform a change operation according to circumstances.

The image adjuster 450 is a component for adjusting information of an object actually seen through the front window of the vehicle based on the driver's eye direction, which is recognized through the position of the driver's irises obtained by the eye position tracking camera 420 and an image of a front view captured by the front view camera 430, and displaying the adjusted information on the head front display device in association with the actually seen object.

That is, the image adjuster 450 is a component for adjusting an image so that information displayed on the head front display device 410 can meet the driver's eye, and adjusting the shape (a perspective view), size, color, and the like, of information associated with an object displayed on the head front display device 410 according to the driver's eye direction in which the driver sees an image through the front window of the vehicle.

The concept of the image adjuster 450 recognizing movement of the driver's irises and tracking the driver's eye direction using the eye position tracking camera 420 will be described with reference to FIG. 9.

Figure 9:
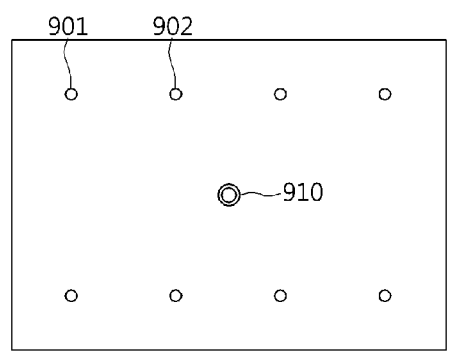
FIG. 9 is a conceptual diagram for explaining a concept of an image adjuster tracking a driver's eye direction through an eye position tracking camera.

FIG. 9 is a conceptual diagram for explaining the concept of the image adjuster 450 tracking the driver's eye direction through the eye position tracking camera 420. Referring to FIG. 9, the image adjuster 450 displays four or more calibration lattice points 901, 902, and the like, at four corners of the head front display device 410, and performs calibration for initially storing positions of the four or more lattice points from the camera using the four or more lattice points as the calibration process so as to anticipate a relative three-dimensional position of an object detected by the eye position tracking camera. When the driver sequentially looks at the four lattice points, the image adjuster 450 recognizes the positions of the irises through the eye position tracking camera and then stores the positions of the irises. The image adjuster 450 calculates relative coordinates of the positions of the irises when the driver views the four lattice points and the positions of the irises (for example, 910) tracked in real time, and tracks the driver's current eye direction. That is, the image adjuster 450 recognizes the irises of both eyes, calculates a vector component between a central point between the irises and the lattice point displayed on the transparent display in the camera calibration operation, and uses a vector component between an object seen in the front and the driver's eyes as the driver eye tracking information. In addition, the face detecting process needs to be performed in advance for accurate eye detection.

The calibration process is performed in a training process performed when the driver enters the vehicle for the first time. Calibration data obtained by the training process depending on the driver's height or body type when the driver enters the vehicle is stored for each driver and selectively applied according to the driver who currently enters the vehicle.

The image adjuster 450 recognizes an object captured by the front view camera 430 according to the driver's eye direction recognized using the eye position tracking camera 420. Thus, the image adjuster 450 can display an image of the object (for example, an arrow indicating a moving direction, the recognized speed of the vehicle that moves forward, detailed information about a road sign, and the like) in an augmented reality manner at the display position of the head front display device 410 corresponding to the position of the captured object (for example, a preceding vehicle, a road sign, and an intersection).

The image adjuster 450 changes the shape of an image to display according to the driver's eye direction, and displays various kinds of information and services necessary during driving as basic functions. The image adjuster 450 may function to continuously adjust the position, the shape, size, and color of an image matched with an actual view seen outside the window in view of the driver's eye direction.

Figure 6:
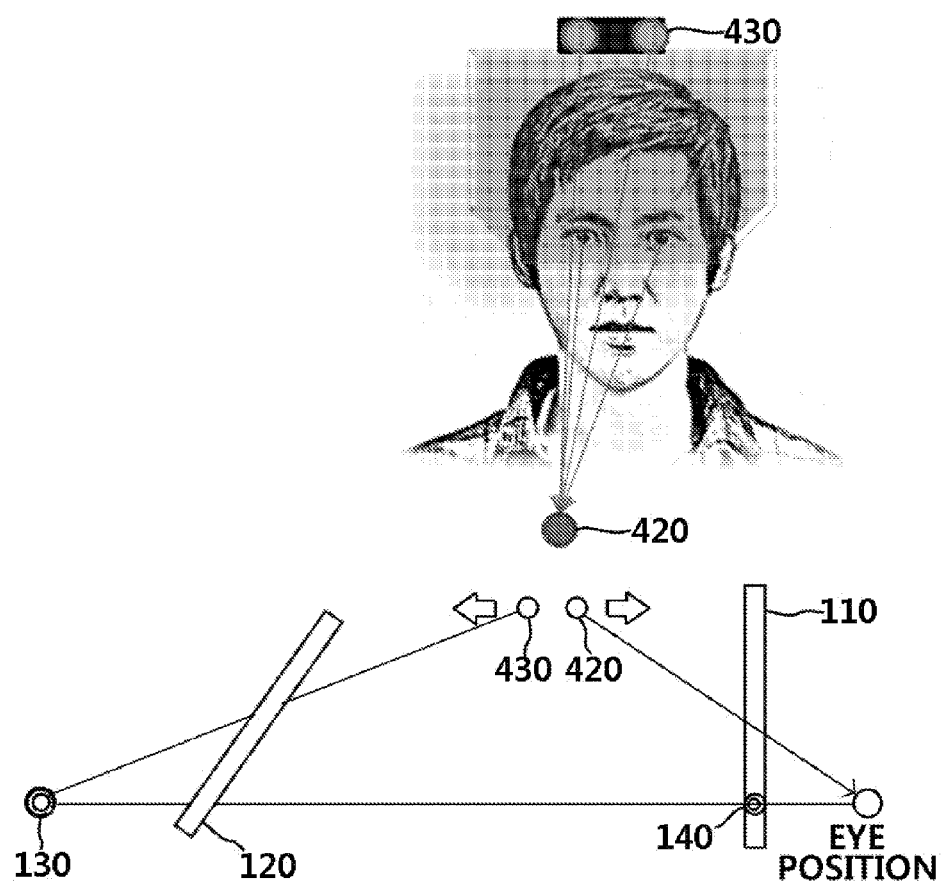
FIG. 6 is a conceptual diagram for explaining a concept for adjusting an image displayed on a display device in association with an object, outside a window, present in a driver's eye direction in an augmented reality display system for a vehicle according to the present invention.

FIG. 6 is a conceptual diagram for explaining a concept for adjusting an image displayed on the display device in association with an object, outside the window, present in the driver's eye direction, in the augmented reality display system for the vehicle according to the present invention.

The eye position tracking camera 420 continuously tracks the driver's eye direction by tracking the driver's irises. The concept of tracking the driver's eye direction through the eye position tracking camera 420 and the image adjuster 450 has been described above with reference to FIG. 9. After the calibration process described with reference to FIG. 9 is performed, the driver's eye direction is tracked according to the movement of the irises. The front view camera 430 recognizes an object 130 within the driver's field of view through the front window 120 of the vehicle. The image adjuster 450 can display information 140 about the object 130 within the driver's field of view at an appropriate position of the head front display device 110 using information obtained from two cameras.

Thus, the driver can feel as if an arrow is displayed on an actual road and see virtual building or neighborhood information in real time. This is a method of applying a conventional technique of receiving position information from a camera and displaying information based on the position information, to real-time augmented reality for a vehicle using a transparent display.

The display unit 460 is controlled by the image adjuster 450 and is a component for controlling the head front display device 410 to display information on the head front display device.

Figure 7:
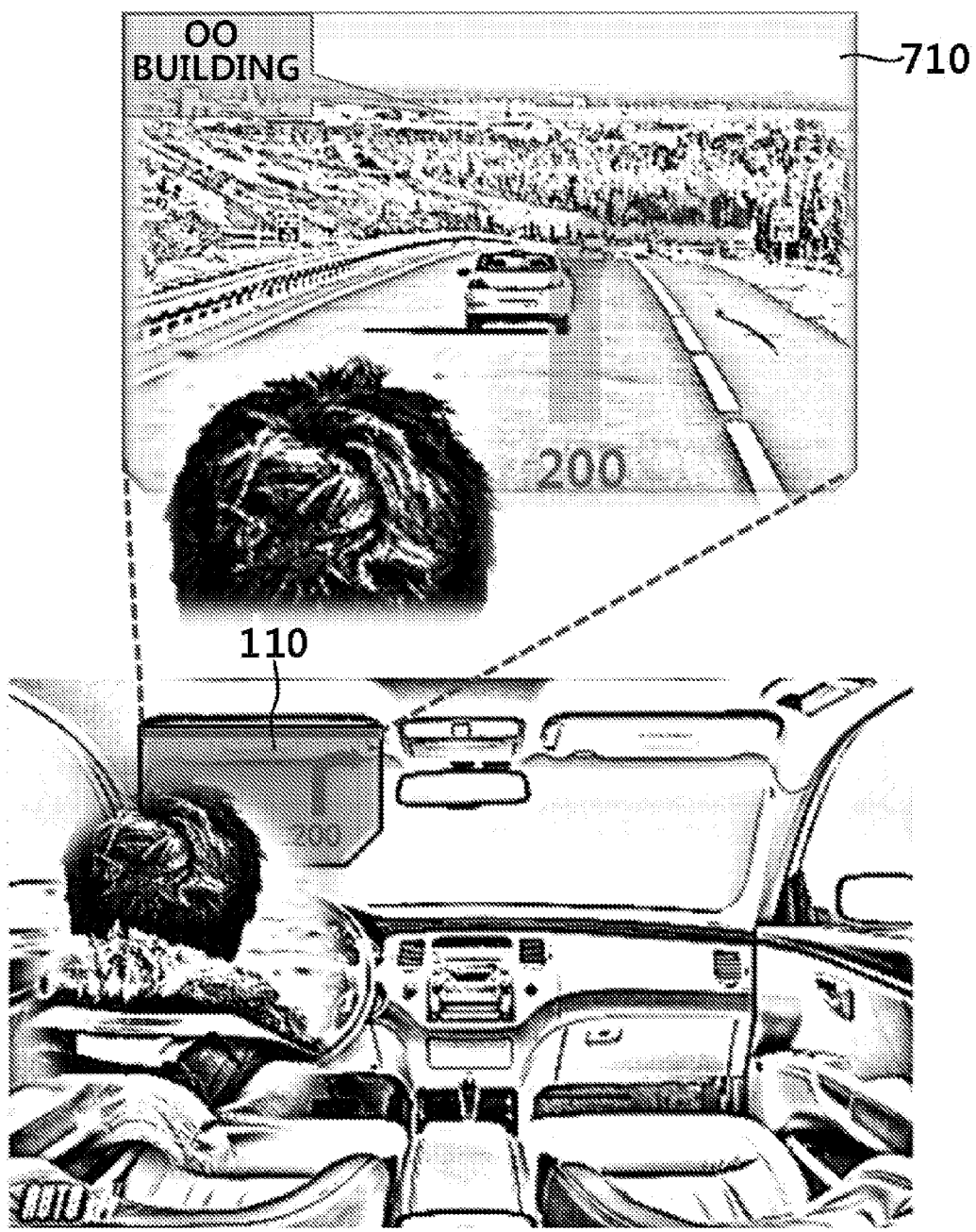
FIG. 7 is a conceptual diagram illustrating an example in which an augmented reality display system for a vehicle according to the present invention provides a driver with information during driving.

FIG. 7 is a conceptual diagram illustrating an example in which the augmented reality display system for the vehicle according to the present invention provides a driver with information during driving.

For example, let us assume that the display device 410 that configures the augmented reality display system for the vehicle according to the present invention is displaying a navigation screen. In this case, the driver can recognize an actual view in front of the vehicle, seen through the front window of the vehicle, and navigation information, displayed on the display device 410, in an integrated manner.

Figure 8:
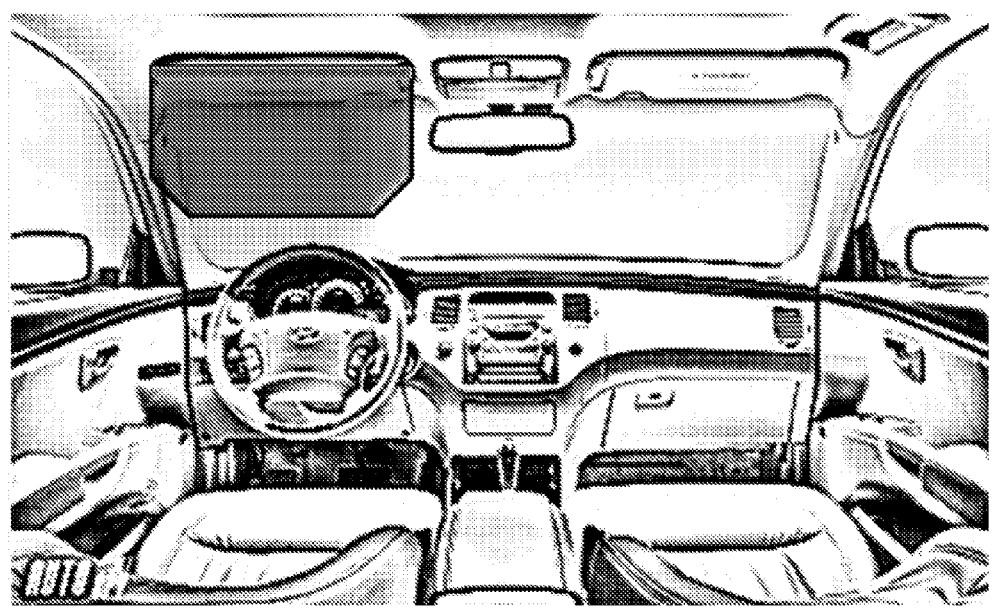
FIG. 8 is a conceptual diagram illustrating another application example which can be used by a display device of an augmented reality display system for a vehicle according to the present invention.

FIG. 8 is a conceptual diagram illustrating another application example which can be used by the display device of the augmented reality display system for the vehicle according to the present invention.

In FIG. 8, shown is an example in which so as to reduce glare on the driver, a chroma of the head front display device is adjusted using information received from an ambient light sensor, a flash sensor, and an external temperature sensor installed in the vehicle, leading to a flash blocking effect.

Figure 10:
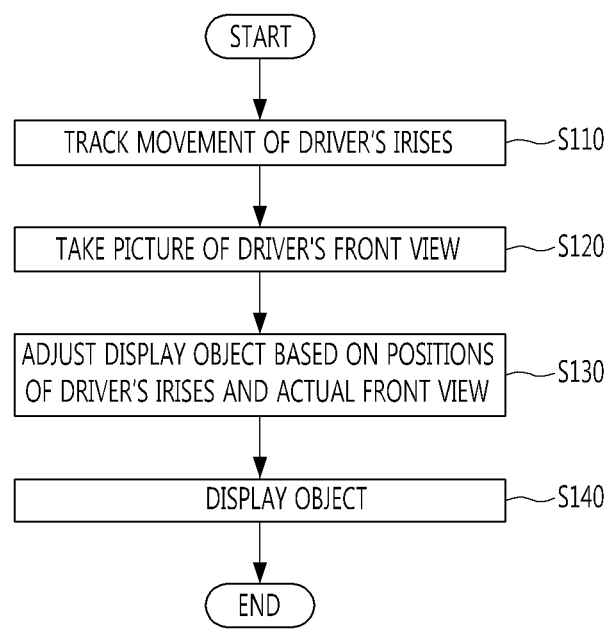
FIG. 10 is a flowchart for explaining an operation method of an augmented reality display system for a vehicle according to the present invention.

FIG. 10 is a flowchart for explaining an operation method of the augmented reality display system for the vehicle according to the present invention.

Referring to FIG. 10, an operation method of the augmented reality display system for the vehicle according to the present invention may include a step (S110) of tracking movement of a driver's irises, a front view capturing step (S120) of taking a picture of a front view seen by the driver through a front window of a vehicle, an image adjusting step (S130) of adjusting the shape or size of an object displayed on a head front display device based on positions of the driver's irises and the captured image of the front view, and a display step (S140) of displaying the object whose image is adjusted on the head front display device.

In step S100 of tracking the movement of the driver's irises, the driver's eye direction is tracked by recognizing the positions of the driver's irises through the eye position tracking camera 420 described with reference to FIG. 4. For the sake of step S110, the calibration process for recognizing the positions of the irises described above needs be performed in advance.

Next, in the front view capturing step S120, a front view seen by the driver through the front window of the vehicle is captured. That is, objects actually seen through the front window of the vehicle are captured by the front view camera 430 positioned above the driver's head or in front of the driver. In this step, the front view camera 430 may be driven to track the driver's eye direction. The camera may have a wide viewing angle and be configured to capture a part of an image present in the driver's field of vision from the captured image.

In the image adjusting step S130, the shape, size, or position of an object corresponding to an object of an actual view is adjusted using information about the driver's eye direction obtained in step S110 of tracking the movement of the driver's irises and the actual view obtained in the front view capturing step S120, and the adjusted image is output on the display device 410.

For example, examples of the object of the actual view may include a preceding vehicle, a road sign, an intersection, and a highway tollgate, and examples of the object displayed on the display device 410 in association with the object of the actual view may include an arrow indicating a moving direction, enlarged information of information recorded on a road sign, highway toll information, overspeed information, and information about traffic accident black spots.

Finally, the image adjusted in the image adjusting step S130 is output on the display device 410 in the display step S140.

Using an augmented reality display system for a vehicle according to the present invention, various kinds of information can be provided to a driver during driving or parking in a manner integrated with an actual view seen through a front window. This prevents the driver's attention from being drawn to operating various devices such as an audio device or media devices used in an existing vehicle. In addition, this allows contents to be arranged within the driver's field of view using a camera.

In addition, in the conventional technique, the user is notified of a direction during driving through a direction indicator displayed on a navigation map. However, according to the present invention, a direction indicator is displayed on an actual view which the driver sees through the front window. Thus, the present invention can surpass limitations of the conventional technique of capturing a front view by a camera and displaying the captured front view on a navigation screen. Furthermore, since information similar to desired neighborhood information and contents provided by an existing smartphone is displayed in front of the driver's eyes, convenience is improved.

While example embodiments of the present invention and their advantages have been described in detail, it should be understood that various changes, substitutions and alterations may be made herein without departing from the scope of the invention.

What is claimed is:

1. An augmented reality display system for a vehicle, comprising:
    a head front display device using a transparent display positioned between a driver and a front window, a space existing between the transparent display and the front window, the head front display device supportably connected to a top of the vehicle interior;
    an eye position tracking camera configured to track movement of a driver's irises;
    a front view camera configured to take a picture of a front view of the driver;
    a head front display device controller configured to implement at least one of an angle change, forward movement, backward movement, upward movement, downward movement, leftward movement, and rightward movement of the head front display device upon detection of a collision involving the vehicle;
    an image adjuster configured to adjust an object displayed on the head front display device in association with an object of an actual view seen through the front window of the vehicle based on positions of the driver's irises obtained through the eye position tracking camera and an image of the front view obtained by the front view camera, the image adjuster adjusting the object displayed on the head front display device by adjusting a shape, size, or position of the object displayed on the head front display device in association with the object in the actual view; and
    a display unit controlled by the image adjuster and configured to display information on the head front display device.

2. The augmented reality display system according to claim 1, wherein the eye position tracking camera is installed at a position in front of and facing the driver.

3. The augmented reality display system according to claim 1, wherein the front view camera is installed above a driver's head or in front of the driver.

4. The augmented reality display system according to claim 1, wherein the eye position tracking camera learns the positions of the driver's irises recognized by the eye position tracking camera and a relative iris position when the driver sees four or more lattice points displayed on the head front display device, and recognizes the positions of the driver's irises based on a learning result.

5. An augmented reality display method for a vehicle for operating a head front display device using a transparent display positioned between a driver and a front window, the method comprising:
    tracking movement of a driver's irises;
    taking a picture of a front view of the driver;
    adjusting a shape, size, or position of an object displayed on the head front display device in association with positions of the driver's irises and an actual object in the front view;
    displaying an object whose image is adjusted on the head front display device: and
    moving the head front display device, the moving being at least one of angle change, forward movement, backward movement, upward movement, downward movement, leftward movement, and rightward movement upon detection of a collision involving the vehicle, the head front display device supportably connected to a top of the vehicle interior.

6. The augmented reality display method according to claim 5, wherein the tracking of the movement of the driver's irises is performed using an eye position tracking camera installed at a position in front of and facing the driver.

7. The augmented reality display method according to claim 5, wherein the taking the picture of the front view of the driver is performed using a front view camera installed above a driver's head or in front of the driver.

* * * * *